United States Patent
Shibuya et al.

(10) Patent No.: US 7,345,832 B2
(45) Date of Patent: Mar. 18, 2008

(54) OPTICAL ELEMENT HOLDING STRUCTURE, OPTICAL ELEMENT LENS-BARREL AND OPTICAL COMMUNICATION MODULE

(75) Inventors: Yoshiki Shibuya, Hachioji (JP); Kazumi Furuta, Akishima (JP); Hiroshi Miyakoshi, Hachioji (JP); Koji Horii, Tokyo (JP)

(73) Assignee: Konica Minolta Holdings, Inc., Tokyo (JP)

(*) Notice: Subject to any disclaimer, the term of this patent is extended or adjusted under 35 U.S.C. 154(b) by 165 days.

(21) Appl. No.: 11/272,655

(22) Filed: Nov. 14, 2005

(65) Prior Publication Data

US 2006/0114579 A1 Jun. 1, 2006

(30) Foreign Application Priority Data

Nov. 29, 2004 (JP) ............................. 2004-343885
Mar. 15, 2005 (JP) ............................. 2005-073095

(51) Int. Cl.
*G02B 7/02* (2006.01)

(52) U.S. Cl. ........................ 359/811; 359/819; 359/823

(58) Field of Classification Search ................ 359/694, 359/699, 703, 704, 811, 819, 822, 823
See application file for complete search history.

(56) References Cited

U.S. PATENT DOCUMENTS

| 5,731,913 A * | 3/1998 | Imanari ...................... 359/700 |
| 6,603,612 B2 * | 8/2003 | Nakano ...................... 359/819 |
| 7,079,332 B2 * | 7/2006 | Tanaka ....................... 359/822 |

FOREIGN PATENT DOCUMENTS

| JP | 06-094957 A | 4/1994 |
| JP | 07-159692 A | 6/1995 |
| JP | 09-049905 A | 2/1997 |
| JP | 10-186197 A | 7/1998 |

* cited by examiner

*Primary Examiner*—M. Hasan
(74) *Attorney, Agent, or Firm*—Frishauf, Holtz, Goodman & Chick, P.C.

(57) ABSTRACT

An optical element holding structure, having: an optical element including an optical section having optical function, an outer peripheral portion which is positioned at the outer peripheral side of the optical section and a mounting portion which protrudes from the outer peripheral portion in a direction substantially parallel to the optical axis; and a lens barrel holding the optical element inside.

20 Claims, 9 Drawing Sheets

FIG. 8

| REFRACTIVE INDEX CHANGE | | | | STRESS (MPA) | | |
|---|---|---|---|---|---|---|
| -40°C | 25°C | 85°C | | -40°C | 25°C | 85°C |
| -1.42E-05 | 5.80E-06 | 1.74E-03 | | -7.09E+00 | 2.90E+00 | 8.70E+00 |
| -1.10E-05 | 4.52E-06 | 1.36E-03 | | -5.52E+00 | 2.26E+00 | 6.78E+00 |
| -7.92E-06 | 3.24E-06 | 9.72E-04 | | -3.96E+00 | 1.62E+00 | 4.86E+00 |
| -4.79E-06 | 1.96E-06 | 5.88E-04 | | -2.40E+00 | 9.80E-00 | 2.94E+00 |
| -1.66E-06 | 6.80E-07 | 2.04E-04 | | -8.31E-01 | 3.40E-01 | 1.02E+00 |
| 0.00E+00 | -6.00E-07 | -1.80E-04 | | 0.00E+00 | -3.00E-01 | -9.00E-01 |
| 4.60E-06 | -1.88E-06 | -5.64E-04 | | 2.30E+00 | -9.40E-01 | -2.82E+00 |
| 7.72E-06 | -3.16E-06 | -9.48E-04 | | 3.86E+00 | -1.58E+00 | -7.74E+00 |
| 1.09E-05 | -4.44E-06 | -1.33E-03 | | 5.43E+00 | -2.22E+00 | -6066E+00 |
| 1.40E-05 | -5.72E-06 | -1.72E-03 | | 6099E+00 | -2.86E+00 | -8058E+00 |
| 1.71E-05 | -7.00E-06 | -2.10E-03 | | 8.56E+00 | -3.50E+00 | -1.05E+01 |

OPTICAL ELEMENT HOLDING STRUCTURE, OPTICAL ELEMENT LENS-BARREL AND OPTICAL COMMUNICATION MODULE

This application claims priority from Japanese Patent Application No. 2004-343885 filed on Nov. 29, 2004 and No. 2005-073095 filed on Mar. 15, 2005, which are incorporated hereinto by reference.

BACKGROUND OF THE INVENTION

This invention relates to an optical element such as a lens, an optical element holding structure for holding the optical element inside a lens barrel, and to an optical-lens barrel and an optical communication module.

Plastic lens are often used in optical devices in view of the fact that they have the advantage of light weight and low cost. However, if temperature changes occur due to the environment in which the device is used, internal stress is generated inside the plastic lens that is supported inside the lens barrel, and the internal refractive index changes due to this stress and causes the double refraction phenomenon to occur. The internal refractive index changes can be expressed using the following formula, but the photo-elasticity index for resin is dependent on temperature as shown in FIG. 9, and tends to increase as the temperature increases, and thus the internal refractive index changes to a great extent due to temperature increases.

Internal refractive index=Amount of change in stress×photo-elasticity index

Patent Document 1 which is listed below discloses a lens holding structure for fixing the lens by pressing it with a ring having screws. In the case of a glass lens, stress is not generated by pressing with the ring, but in the case of a plastic lens, stress is concentrated at the area where the ring is pressed, and as described above double refraction occurs at the lens.

Patent Documents 2 and 3 which are listed below, each disclose a lens mechanism in which stress is applied to the outer periphery of the lens and the refractive index is changed, an imaging device that uses said lens mechanism, a lens for varying its focal length and a method for varying the focal length. However, when comparing the change in stress in the optical axis direction and that on the surface perpendicular to the optical axis, the change in stress in the optical axis direction is significantly different from the change in stress on the surface perpendicular to the optical axis, causing internal double refraction.

Patent Document 4 which is listed below, discloses an optical unit which uses a plastic lens having a structure in which an external force is applied to the plastic lens and the applied external force is caused to operate in the direction where the internal stress of the plastic lens is reduced, and then stress is reduced after releasing the internal stress and adjusting the optical characteristics, as well as a twist and release method and a mounting method for the plastic lens. In this optical unit, a mechanism is provided for reducing the stress on the mounting portion of the plastic lens, but this causes the optical axis to shift. In particular, when the lens undergoes repeated thermal expansion and thermal contraction due to temperature changes the optical axis shifts.

A conventional example of the optical communication signal transmission module that is disposed at the terminal for sending and receiving optical signals in the optical communication system formed by the optical transmission paths such as those of optical fiber is shown in FIG. 13. In a conventional optical communication signal transmission module 100 shown in FIG. 13, the optical signals from the optical transmission paths of the optical communication system are radiated from the end surface of optical fiber 101 and transmitted through a wavelength splitting filter 102 and then passed through a collimator 106 and then received at a light receiving element 103. In addition, the optical signals from a light emitting diode 104 passes through a collimator lens 109 and is reflected at the wavelength splitting filter 102 and entered onto the end surface of the optical fiber 101, and then sent to the optical transmission path of the optical communication system. The collimator lenses 106 and 109 are fixed inside lens barrels 105 and 108 by rings 107 and 110 respectively. The rings 107 and 110 are mounted by YAG laser welding.

In FIG. 13, the lens barrels 105 and 108 and the rings 107 and 110 are formed of metal, and the collimator lens as 106 and 109 are formed of glass. In this manner, because of the difference in the linear expansion coefficient, when the plastic lens 106 and 109 are fixed to the metal lens barrels 105 and 108, distortion occurs between the lens 106 and 109 and lens barrels 105 and 109 due to temperature changes caused by the environment in which the optical communication transmission module 100 is used. It is to be noted that here the linear expansion coefficient of the plastic is 6.00× $10^{-5}$ for example, the linear expansion coefficient of the metal is for example, $1.08 \times 10^{-5}$.

Stress inside the plastic lens is generated due to the above-described distortion, and furthermore the middle position of the lens sometimes shifts due to the method for fixing the lens inside the lens barrel. This shift in the middle position of the lens causes a relative shift of the middle position on the surface of the end of the optical fiber with respect to the light receiving element and the light emitting diode. For example, as shown in FIG. 14, if the x-axis position on the surface of the end surface of the optical fiber shifts from the center by only a few μm (same for the y-axis position), the output value rapidly decreases. In this manner, the signal-sending and signal-receiving properties of the transmission module are deteriorated by the environment in which the optical communication transmission module is used.

[Patent Document 1] Japanese Patent Application Laid-Open No. 6-94957 Publication

[Patent Document 2] Japanese Patent Application Laid-Open No. 7-159692 Publication

[Patent Document 3] Japanese Patent Application Laid-Open No. 9-49905 Publication

[Patent Document 4] Japanese Patent Application Laid-Open No. 10-186197 Publication

SUMMARY OF THE INVENTION

This invention was conceived in view of the above-described problems of the conventional and the object thereof is to provide an optical element in which it is possible to control the deterioration in optical properties even when there are changes in the environmental temperature and an optical element holding structure and a optical element lens barrel which limits the generation of internal stress in the optical element and controls the changes internal double refraction index with the optical element being held in the lens barrel even when temperature changes occur, and also which prevents shifting of the optical axis of the optical elements. An additional object of this invention is to provide an optical communication module using the optical element and optical element holding structure described above.

In order to achieve the objects described above, the optical element of this invention is made up of: an optical section having an optical function; and a stress reducing section which is positioned at the outer peripheral side of the optical section and is for reducing the stress generated when the environmental temperature changes.

With this optical element, when there are changes in the environmental temperature, stress generated by the changes in the environmental temperature is reduced by the stress reducing section and thus deformation of the optical section is controlled, changes in the internal refractive index is controlled, and deterioration of optical properties of the optical section is also controlled.

The stress reducing section in this optical element preferably is composed of an outer peripheral portion which is positioned at the outer peripheral side of the optical section and a mounting portion which protrudes from the outer peripheral portion in a direction substantially parallel to the optical axis.

The stress generated when the environmental temperature changes in a state where the optical element is fixed inside the lens barrel by the mounting portion is reduced by the stress reducing section and deformation of the optical section is controlled.

The optical element is formed from a material whose linear expansion coefficient is larger than the linear expansion coefficient of the material forming the lens barrel. Thus if for example, the material forming the optical lens is plastic, the material forming the lens barrel can be steel and the material cost and processing cost are thereby reduced.

It is also preferable that the outermost peripheral portion at the opposite side on the mounting portion of the outer peripheral portion is beveled as this further reduced the stress concentration on the optical section when there are temperature changes.

The first optical element holding structure of this invention holds an optical element including an optical section having an optical function such as a lens; an outer peripheral portion which is positioned at the outer peripheral side of the optical section and a mounting portion which protrudes from the outer peripheral portion in a direction substantially parallel to the optical axis, inside the lens barrel by bonding and fixing the holding portion that is provided inside the lens barrel so as to oppose the mounting portion.

With this first optical element holding structure, when the optical element is held inside the lens barrel, the mounting portion of the optical element which protrudes in a substantially parallel direction with respect to the optical axis is made to oppose the holding portion in the lens barrel and then bonded and fixed and thus even if there is a temperature change, deformation caused by temperature changes is mainly generated at the bonding surface or the mounting portion and because the optical section is disposed via the mounting portion, there is little or no deformation at the optical section which is away from the bonding surface. As a result, the generation of internal stress in the optical section is suppressed, change in the internal refractive index is controlled and deterioration in the optical properties of the optical section is controlled. In addition, because, the optical element is fixed with the mounting portion so as to oppose the holding portion in the lens barrel, shifting of the optical axis of the optical element is prevented.

In the first optical element holding structure, the optical element is preferably held in the lens barrel by fixing the holding portion and the mounting portion with a bonding agent. In this case, the bonding agent is preferably ultraviolet hardening resin.

In addition, the bonding strength between bonding surfaces of the mounting portion of the optical element and the holding portion of the lens barrel is preferably improved by being roughened using such a process as blasting.

Also, given that the outer diameter of the optical element is D and the distance from the surface at the opposite side of the mounting portion of the outer peripheral portion to the front end of the mounting portion is L, and the thickness of the outer peripheral portion is A, by satisfying equations (1) and (2), the deformation caused by temperature change mainly occurs at the bonding surface and the mounting portion, and little or no deformation occurs at the optical section.

$$D \geq 10 \times A \quad (1)$$

$$L \geq 2.5 \times A \quad (2)$$

The second optical element holding structure of this invention holds an optical element including an optical section having an optical function; an outer peripheral portion which is positioned at the outer peripheral side of the optical section and a mounting portion which protrudes from the outer peripheral portion in a direction substantially parallel to the optical axis, inside the lens barrel by fixing the mounting portion and the holding portion provided in the lens barrel with a step portion.

With this second optical element holding structure, when the optical element is held inside the lens barrel, the mounting portion of the optical element which protrudes in a substantially parallel direction with respect to the optical axis is fixed to the holding portion inside the lens barrel using the step portion, and thus even if there is a temperature change, deformation caused by the temperature change is mainly generated at the step portion and the mounting portion and because the optical section is disposed via the mounting portion, there is little or no deformation caused by temperature change at the optical section which is away from the step portion. As a result, the generation of internal stress in the optical section is controlled, change in the refractive index is controlled and deterioration in the optical properties of the optical section is controlled. In addition, because the optical element is fixed by the step portion in the holding portion of the lens barrel with the mounting portion, shifting of the optical axis of the optical element is prevented.

In the second optical element holding structure, the mounting portion of the optical element has mounting step surface, and the holding portion has a holding step surface which corresponds to the mounting step surface in the inner surface of the lens barrel, and the mounting step surface and the holding step surface are fixed so as to oppose each other. In this case, the holding ring is preferably mounted to the inner surface of the lens barrel so as to press the mounting surface at the opposite side of the mounting step surface of the optical element.

The third optical element holds an optical element including an optical section having an optical function; an outer peripheral portion for positioning at the outer peripheral side of the optical section and a mounting portion which protrudes from the outer peripheral portion in a direction substantially parallel to the optical axis, between a holding portion which is provided inside the lens barrel so as to oppose the mounting portion and the ring-like member which is disposed inside the lens barrel so that the protruding portion presses the outer peripheral portion which is at the opposite side from the mounting portion.

With this third optical element holding structure, when the optical element is held inside the lens barrel, the mounting portion of the optical element which protrudes in a substantially parallel direction with respect to the optical axis is caused to oppose the holding portion in the lens barrel and the outer peripheral portion at the side opposite to the mounting portion of the optical element is pressed in the optical axis direction by the protruding portion of the ring-shaped member that is disposed inside the lens barrel thereby held and thus even if there is a temperature change, the optical element expands substantially freely, and concentration of the stress caused by temperature change becomes difficult. As a result, generation of internal stress in the optical section is suppressed, change in the internal refractive index is controlled and deterioration in the optical properties of the optical section is controlled.

In the third optical element holding structure, the protruding portion of the ring-like member abuts the incline surface that is provided on the outer peripheral portion that is at the opposite side from the mounting portion. Thus, the protruding portion of the ring-like member presses the optical element to the outer side in the radial direction on the periphery of the incline surface and as a result it is difficult for the optical axis of the optical element to shift and shifting of the optical axis of the optical element is prevented.

The fourth optical element holding structure of this invention holds an optical element including an optical section having an optical function; an outer peripheral portion for positioning at the outer peripheral side of the optical section and a mounting portion which protrudes from the outer peripheral portion in a direction substantially parallel to the optical axis, between a holding portion which is provided inside the lens barrel so as to oppose the mounting portion and the ring-like member which is disposed inside the lens barrel so that the ring is on top of the outer peripheral portion which is at the opposite side from the mounting portion and which presses the ring.

With this fourth optical element holding structure, when the optical element is held inside the lens barrel, the mounting portion of the optical element which protrudes in a substantially parallel direction with respect to the optical axis is made to oppose the holding portion in the lens barrel and the outer peripheral portion at the side opposite to the mounting portion of the optical element is pressed and held in the optical axis direction with the ring-like member which is disposed inside the lens barrel via the ring which is on top of outer peripheral portion and thus even if there is a temperature change, the optical element expands substantially freely, and concentration of the stress caused by temperature change becomes difficult. As a result, the generation of internal stress in the optical section is suppressed, change in the refractive index is controlled and deterioration in the optical properties of the optical section is controlled.

In the fourth optical element holding structure, by disposing the ring at the rim formed in the outer peripheral portion, the ring presses the optical element to the outer side in the radial direction on the periphery of the rim and as a result it is difficult for the optical axis of the optical element to shift and shifting of the optical axis of the optical element is prevented. In this case, the ring is preferably formed of a material that is not too hard and not too soft, and fluorine resin, for example, is preferable.

In the third and fourth optical element holding structure, it is preferable that the holding portion protrudes inside the lens barrel from the inner surface of the lens barrel in the direction which substantially crosses the optical axis so as to abut the mounting portion of the optical section.

It also preferable that in the first to fourth optical element holding structures, the outermost peripheral portion at the opposite side to the mounting portion of the outer peripheral portion are beveled since this further reduces the stress concentration on the optical section when there is a temperature change.

In the first to fourth optical element holding structures, the optical element is formed from a material whose linear expansion coefficient is larger than that of the material forming the lens barrel. Thus if, for example, the material forming the optical lens is plastic, the material forming the lens barrel can be steel and the material cost and processing cost is thereby reduced.

In the first to fourth optical element holding structures, the optical element is the above-described optical element made up of an optical section having an optical function and a stress reducing section which is positioned at the outer peripheral side of the optical section and is for reducing the stress generated when the environmental temperature changes. As a result, when the optical element is fixed in the lens barrel, the stress generated by the difference in expansion and contraction between the optical element and the lens barrel due to a temperature change in the environment of use can be prevented and thus it is unlikely that this stress will be generated in the optical section. Thus deformation of the optical section of the optical element is controlled, deterioration of optical properties of the optical section is controlled and shifting of the optical axis of the optical element is prevented.

In the optical element lens barrel of this invention, the optical elements are held in the lens barrel by the first to fourth optical element holding structures. According to the optical element lens barrel, even if there is a temperature change in the lens barrel when the optical lens is held, generation of the internal stress in the optical section is controlled, change in the internal refractive index is controlled and shifting of the optical axis of the optical element is prevented.

The optical communication module of this invention includes the above-described optical element comprising an optical section having an optical function and a stress reducing section which is positioned at the outer peripheral side of the optical section and is for reducing the stress generated when the environmental temperature changes.

With this optical module, even if there is a temperature change in the environment in which it is being used, deformation of the optical section of the optical element is controlled, deterioration of optical properties of the optical section is controlled and shifting of the optical axis of the optical element is prevented and thus even when used in an environment where there are temperature changes, deterioration of the optical properties of the optical communication module is prevented.

In a separate optical communication module of this invention, the optical elements are held in the lens barrel by the first to fourth optical element holding structures.

With this optical communication module, even if there is a temperature change in the environment in which it is being used, deformation of the optical section of the optical element is controlled, deterioration of optical properties of the optical section is controlled and shifting of the optical axis of the optical element is prevented and thus even when used in an environment where there are temperature changes, deterioration of the optical properties of the optical communication module is prevented.

The bidirectional optical communication module of this invention is made up of a light emitting diode for sending optical signals to the optical fiber terminal; a light receiving element for receiving optical signals from the optical fiber terminal; a separating means for separating the first optical path between the optical fiber terminal and the light emitting diode and the second optical path between the optical fiber terminal and the light receiving element; and an optical element that is disposed between the optical fiber terminal and at least either the light emitting diode or the light receiving element, and the optical element is the above-described optical element made up of an optical section having an optical function and a stress reducing section which is positioned at the outer peripheral side of the optical section and is for reducing the stress generated when the environmental temperature changes.

With this bidirectional optical communication module, even if there is a temperature change in the environment in which it is being used, deformation of the optical section of the optical element is controlled, deterioration of optical properties of the optical section is controlled, and shifting of the optical axis of the optical element is prevented and thus even when used in an environment where there are temperature changes, deterioration of the signal sending and signal receiving properties of the optical communication module is controlled.

A separate bidirectional optical communication module of this invention is made up of a light emitting diode for sending optical signals to the optical fiber terminal; a light receiving element for receiving optical signals from the optical fiber terminal; a separating means for separating the first optical path between the optical fiber terminal and the light emitting diode from the second optical path between the optical fiber terminal and the light receiving element; and an optical element that is disposed between the optical fiber terminal and at least one of the light emitting diode and the light receiving element, and the optical element is held in the lens barrel by first to fourth optical elements.

With this separate bidirectional optical communication module, even if there is a temperature change in the environment in which it is being used, deformation of the optical section of the optical element is controlled, deterioration of optical properties of the optical section is controlled, and shifting of the optical axis of the optical element is prevented and thus even when used in an environment where there are temperature changes, deterioration of the signal sending and signal receiving properties of the optical communication module is suppressed.

In the optical elements of this invention, even if there are changes in the environmental temperature, deterioration of the optical properties is limited.

Also in the optical element holding structure and optical element lens barrel of this invention, even there is a temperature change when the optical element is held in the lens barrel, generation of internal stress in the optical section is suppressed and change in the internal refractive index is controlled and thus deterioration in optical properties can be controlled and shifting of the optical axis of the optical element is prevented.

Even when this optical communication module is used in an environment where there are temperature changes, deterioration of the signal sending and signal receiving properties of the optical communication module is suppressed.

BRIEF DESCRIPTION OF DRAWINGS

FIG. 8 is a figure indicating a distribution of refraction rate change and internal stress generated in the plastic lens of FIG. 6 at each temperature (−40° C., 25° C. and 85° C.) by values corresponding to the colors;

DETAILED DESCRIPTION OF THE PREFERRED EMBODIMENT

The following is a description of the preferred embodiments of this invention using the drawings.

First Embodiment

Figure 1:
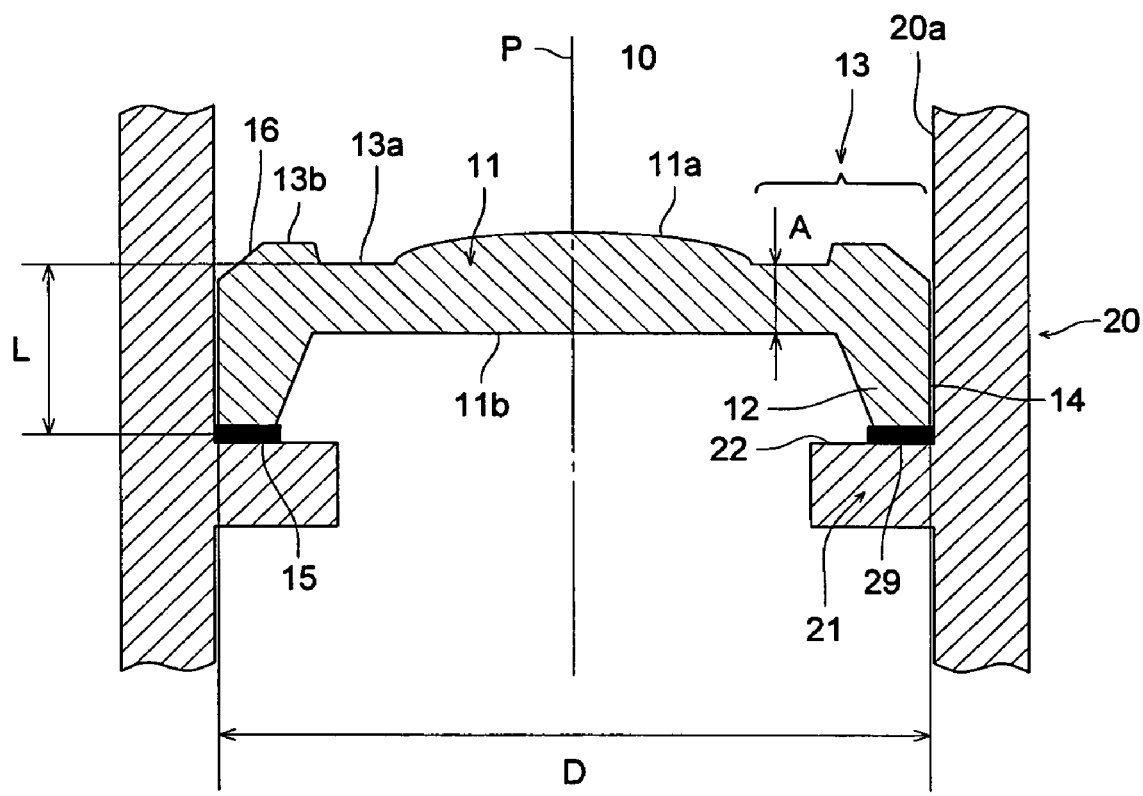
FIG. 1 is an essential part vertical cross-sectional view showing the first embodiment of lens holding structure.

FIG. 1 is a main part vertical portion showing the lens holding structure of the first embodiment. The lens holding structure shown in FIG. 1 fixes and holds a lens 10 onto the inner surface 20a of a cylindrical lens barrel 20 using a bonding agent.

The lens 10 is made up of a lens portion 11 which has a lens function; an outer peripheral portion 13 which is positioned on the outer peripheral side of the lens portion 11 and extends to the outermost periphery 14 of the lens 10; and a mounting portion 12 which protrudes from the outer peripheral portion 13 in a direction substantially parallel to the optical axis p, and is a plastic lens which is formed from a resin for optical elements. The lens 11 has a convex portion 11a which is the center of the optical axis p, and the flat surface 11b which at the opposite side of the convex portion 11a extends from the lens portion 11 to a part of the outer peripheral portion 13. The stress reducing section is formed from the outer peripheral portion 13 and the mounting portion 12.

The mounting portion 12 extends so as to form a leg portion which has a substantially rectangular cylindrical configuration at the opposite side from a convex portion 11a, and the outer periphery which opposes the inner surface 20a of the lens barrel 20 forms the outermost periphery 14 of the lens 10 and inclines and with respect to the optical axis p, and extends from the outermost periphery of a flat surface 11b at the opposite surface (inner surface) side of the outermost periphery 14. The front end portion of the mounting portion 12 has a mounting surface 15 which is formed in the direction which crosses the optical axis p.

The outer peripheral portion 13 has a concave portion 13a whose inner peripheral side which contacts the convex portion 11a is formed inwards at the convex portion 11a side of the lens portion 11, and a convex portion 13b which is a protrusion of the outer peripheral side of the concave portion 13a. The corner portion of the outermost periphery 14 side of the convex portion 13b is beveled to form a beveled portion 16. The beveled portion 16 may also be formed as a bent surface configuration.

The lens barrel 20 is made up of a holding portion 21 which is formed so as to protrude in a collar-like configuration from the inner surface 20a in the direction crossing the optical axis p (the radial direction inner side of the lens barrel 20). The collar-like holding surface 22 of the holding portion 21 is formed so as to oppose the mounting surface 15 of the mounting portion 12 of the lens 10. The lens barrel 20 is preferably formed from a metallic material such as steel or alloys of iron, nickel or cobalt (such as Kovar (trade name)).

In the case where the lens 10 is mounted and held in the lens barrel 20, the lens 10 is inserted into the lens barrel 20 from the upper side of FIG. 1 with the mounting portion 12 at the lower side thereof. At this time by applying a bonding agent in advance to at least one of the mounting surface 15 and the holding surface 22 a bonding agent layer 29 is formed between the mounting surface 15 and the holding surface 22. In the case where an epoxy type ultraviolet hardening substance is used as the bonding agent, the bonding agent layer may be hardened by radiating ultraviolet light after inserting the lens 10 into the lens barrel 20.

Due to the above described configuration, the lens 10 is fixed and held on the holding portion 21 in the lens barrel 20 by a bonding agent layer 29 using the mounting portion 12. However because of the lens holding structure of FIG. 1, even if there is a temperature change due to the environment in which the device is being used, deformation of the lens barrel 20 caused by temperature changes is mainly generated at the bonding agent layer 29 and the mounting portion 12 and thus the force caused by the temperature change can be reduced. Because the lens portion 11 is disposed via the mounting portion 12 and is away from the bonding agent layer 29, there is little or no deformation caused by the temperature change. In this manner the internal stress generated at the lens portion 11 is suppressed and change in the internal refractive index can be controlled. Furthermore because the lens 10 is fixed by the bonding agent layer 29 so as to oppose the holding portion 21 in the lens barrel 20 using the mounting portion 12 shifting of the optical axis of the lens 10 is prevented.

The mounting surface 15 of the mounting portion 12 of the lens 10 and the holding surface 22 of the holding portion 21 of the lens barrel 20 are preferably roughened by being subjected to blast processing for example as this improves the bonding strength between the bonding surfaces of the mounting surface 15 and the holding surface 22.

It is to be noted that bonding agent is not applied between the outer most periphery 14 of the lens 10 and the inner surface 20a of the lens barrel 20. Also the outer diameter of the outermost periphery 14 of the lens 10 is made smaller than the inner diameter of the lens 20 such that the lens 10 can be loosely fit into the lens barrel 20.

Due to the above described configuration, even if stress is generated by the deformation of the lens 10 as a result of temperature changes in the lens holding structure of FIG. 1, because the length in the direction of the optical axis p of the mounting portion 12 which has a rib-like configuration is long, most of the stress is concentrated at the bonding agent layer which is between the mounting surface 15 and the holding surface 22. Thus the bonding layer 29 and the entire mounting portion 12 deforms to a large extent and so the mounting portion 12 needs to have a prescribed length in the direction of the optical axis p.

Namely, as shown in FIG. 1 given that the distance between the concave portion 13a of the outer peripheral portion 13 and the mounting surface 15 of the mounting portion 12 is L; the thickness of the concave portion 13a of the outer peripheral portion 13 is A; and the outer diameter of the lens 10 is D, by setting each of the dimensions so as to satisfy equations (1) and (2), there is a great amount of deformation of the bonding agent layer 29 and the entire mounting portion 12. Thus it is unlikely that the lens portion 11 will deform and stress will be generated.

$$D \geq 10 \times A \tag{1}$$

$$L \geq 2.5 \times A \tag{2}$$

In FIG. 1 bonding agent is used for bonding and fixing the mounting portion 12 of the lens 10 to the holding portion 21 of the lens barrel 20, but the invention is not limited thereto, and various bonding methods such as solvent adhesion, depositing (thermal bonding), ultrasonic bonding, and welding.

Second Embodiment

Figure 2:
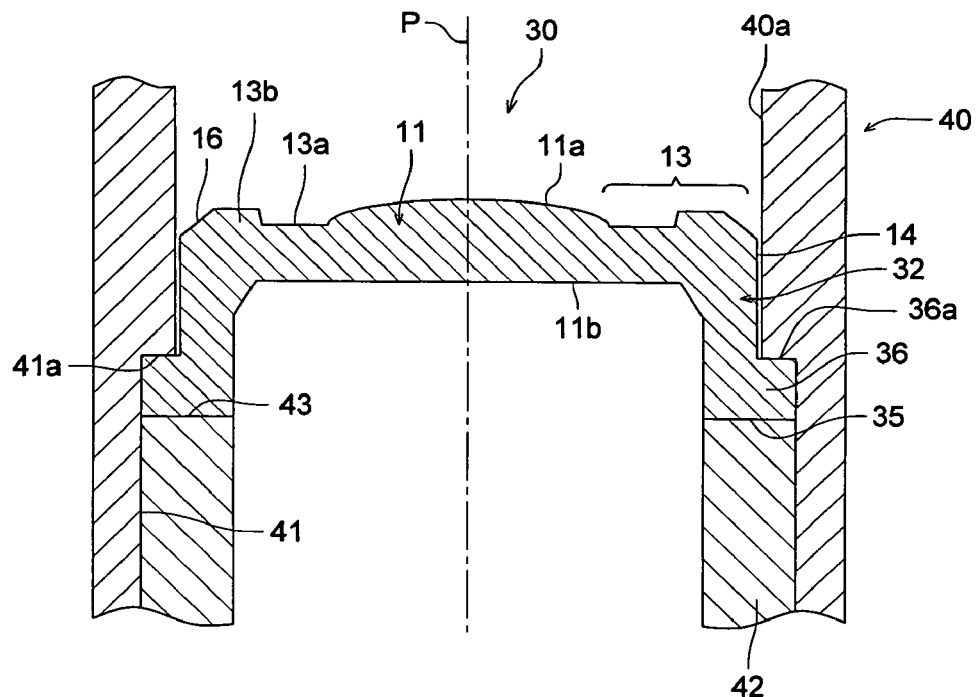
FIG. 2 is an essential part vertical cross-sectional view showing the second embodiment of lens holding structure.

FIG. 2 is a main part vertical portion showing the lens holding structure of the second embodiment. The lens holding structure shown in FIG. 2 fixes and holds a lens 30 onto an inner surface 4.0a of a lens barrel 40 using a step structure.

As shown in FIG. 2, compared to the lens 10 of FIG. 1, the lens 30 is has substantially the same structure as that of FIG. 1 except for the fact that the mounting portion protrudes from the outer peripheral portion 13 in the direction substantially-parallel to the optical axis p has a step portion 36 which protrudes further out than the outermost periphery 14 of the lens 30 at the lower side that is opposite to the convex portion 11a of the lens portion 11. As a result, the parts that are the same have been assigned the same numbers and descriptions thereof have been omitted.

In addition the lower portion in FIG. 2 of the inner surface 40a of the lens barrel 40 is formed at an inner surface portion 41 having an inner diameter that is larger than that of the inner surface 40a, and a step portion 41a is formed between the inner surface 40a and the inner surface portion 41. The inner surface portion 41 of the lens barrel 40 corresponds to the step portion 36 of the lens 30 and the step surface 41a corresponds to the step surface 36a of the step portion 36.

A holding ring 42 disposed in the lens barrel 40 on the inner surface portion 41, from lower part of FIG. 2 and the end surface 43 of the holding 42 is made to contact and press the mounting surface 35 of the step portion 36 of the lens 30 and the step portion 36 of the lens 30 is thereby fixed so as to be nipped between the step surface 41a and the end surface 43.

In the case where the lens 30 is mounted and held in the lens barrel 40, the lens 30 is inserted into the lens barrel 40 from the lower side of FIG. 2 with the convex portion 11a at the upper side thereof, and the step surface 36a of the step portion 36 of the lens 30 abuts the step surface 41a of the lens barrel 40. In addition, the holding ring 42 is inserted onto the inner surface portion 41 of the lens barrel 40 from the lower side of FIG. 2, and the end surface 43 of the front end contacts and presses on the mounting surface 35 of the lens 30. In this state, the holding ring 42 is fixed to the inner surface portion 41 of the lens barrel 40 by a bonding agent, ultrasonic wave fusion or by fitting or the like.

Due to this configuration, the step portion 36 of the mounting portion 32 of the lens 10 is fixed by being nipped between the step surface 41a in the lens barrel 40 and the end surface 43 of the holding ring 42 that was inserted and the lens 30 is thereby held inside the lens barrel 40. With the lens holding structure of FIG. 2, if there is a temperature change due to the environment in which the device is used, deformation of the lens barrel 40 caused by the temperature change is mainly generated at the step portion 36 and the mounting portion 32 and stress caused by temperature change is reduced. Because the lens portion 11 is disposed via the mounting portion 32 and is away from the step portion 36, there is little or no deformation caused by temperature change. In this manner, the generation of internal stress in the lens portion 11 of the lens 30 is suppressed and change in the refractive index is controlled. In addition, because, the lens 30 is fixed in the lens barrel 40 at the step portion 36 using the step structure, shifting of the optical axis of lens 30 is prevented.

It is to be noted that the outer diameter of the outermost periphery 14 of the lens 30 is made smaller than the inner diameter of the inner surface 40a of the lens barrel 40 so that the lens 30 can be loosely fit into the inner surface 40a of the lens barrel 40.

As described above, in the lens holding structure of FIG. 2, even if stress is generated by the deformation of the lens 30 caused by a temperature change, because the length in the direction of the optical axis p of the mounting portion 32 which has a rib-like configuration is long, most of the stress is concentrated on the step portion 36 at the lower end side of the mounting portion 32. Thus the step portion 36 and the entire mounting portion 32 deforms to a large extent and so the mounting portion 32 needs to have a prescribed length in the direction of the optical axis p.

Third Embodiment

Figure 3:
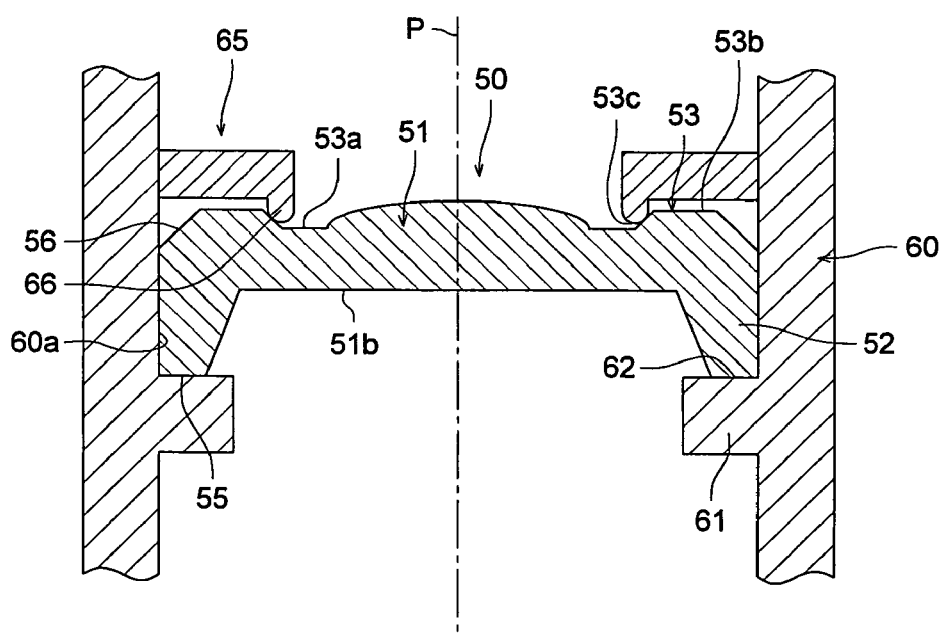
FIG. 3 is an essential part vertical cross-sectional view showing the third embodiment of lens holding structure.

FIG. 3 is a main part vertical portion showing the lens holding structure of the third embodiment. The lens holding structure shown in FIG. 3 holds a lens 50 onto the inner surface 60a of a cylindrical lens 60 using the ring-like member 65.

The lens 50 is made up of a lens portion 51 which has a lens function; an outer peripheral portion 53 which is positioned on the outer peripheral side of the lens portion 51 and extends to the outermost periphery 54 of the lens 50; and a mounting portion 52 which protrudes from the outer peripheral portion 53 in a direction substantially parallel to the optical axis p, and is a plastic lens which is formed from a resin for optical elements. The lens 51 has a convex portion 51a which is the center of the optical axis p and a flat surface 51b which at the opposite side from the convex portion 51a extends from the lens portion 51 to a part of the outer peripheral portion 53.

The mounting portion 52 extends so as to form a leg portion which has a substantially square cylindrical configuration from the convex portion 51a to the opposite side, and the outer periphery which opposes the inner surface 60a of the lens barrel 60 forms the outermost periphery 54 of the lens 50 and inclines and with respect to the optical axis p, and extends from the outermost periphery of the flat surface 51b at the opposite surface (inner surface) side of the outermost periphery 54. The front end portion of the mounting portion 52 has a mounting surface 55 which is formed in the direction which crosses the optical axis p.

The outer peripheral portion 53 has a convex portion 53a whose inner periphery side which contacts the convex portion 51a is formed inwards at the convex portion 51a side of the lens portion 51 and a convex portion 53b which is a protrusion of the outer peripheral side of the concave portion 53a. The side of the outermost periphery 54 of the convex portion 53b is beveled at the corner to form a beveled portion 56. The beveled portion 56 may also have a bent surface configuration.

The lens barrel 60 comprises a holding portion 61 which is formed so as to protrude as a collar-like configuration from the inner surface 60a in the direction crossing the optical axis p (the radial direction inner side of the lens barrel 60). The collar-like holding surface 62 of the holding portion 61 is formed so as to oppose the mounting surface 55 of the mounting portion 52 of the lens 50. The lens barrel 60 is preferably formed from a metallic material such as steel, or alloys of iron, nickel and cobalt (such as that commercially available as Kovar).

A metal ring member 66 is disposed on the inner surface 60a of the lens barrel 60 in the upper portion in FIG. 3 of lens 50, and the ring-shaped member 65 has a ring-shaped protruding portion 66 at the inner peripheral side thereof. The protruding portion 66 contacts an incline surface 53c that is formed at the outer peripheral side of the concave portion 53a of the outer peripheral part of the lens 50.

In the case where the lens 50 is mounted and held in the lens barrel 60, the lens 50 is inserted into the lens barrel 60 from the upper side of FIG. 3 with the mounting portion 52 at the lower side thereof, and abuts the holding surface 62 of holding portion 61 of the lens barrel 60. Next, the lens 50 is inserted into lens barrel 60 so as to fit onto the ring-like member 65 from the top of FIG. 3, and the protruding portion 66 of the ring-like member 65 contacts and presses on the incline surface 53c of the outer periphery 53 of the lens 50.

Due to this configuration, the lens 50 can be held between the holding member 61 of the lens barrel 60 and the ring-like member 65, but due to the lens holding structure of FIG. 3, even if there is a temperature change due to the environment in which the lens barrel 60 is used, because the lens 50 is only pressed by the ring-like member 65 from the upper portion of the drawing, the lens 50 expands substantially freely due to the temperature change, and concentration of the stress caused by temperature changes on the lens portion 51 becomes unlikely and internal stress generated due to temperature changes is reduced. In this manner, generation of internal stress at the lens portion 51 is suppressed and change in the internal double refraction index is controlled.

In addition, the incline surface 53c needed for construction of cast and mold when manufacturing the lens 50 is used to press onto the protruding portion 66 of the ring-like member 65 and thus even if there is a temperature change, shifting of the optical axis of the lens 50 in the lens barrel 60 is prevented.

It is to be noted that the outer diameter of the outermost periphery 14 of the lens 10 is smaller than the inner diameter if the lens barrel 20 so that the lens 10 can be loosely fit into the lens barrel 20.

Fourth Embodiment

Figure 4:
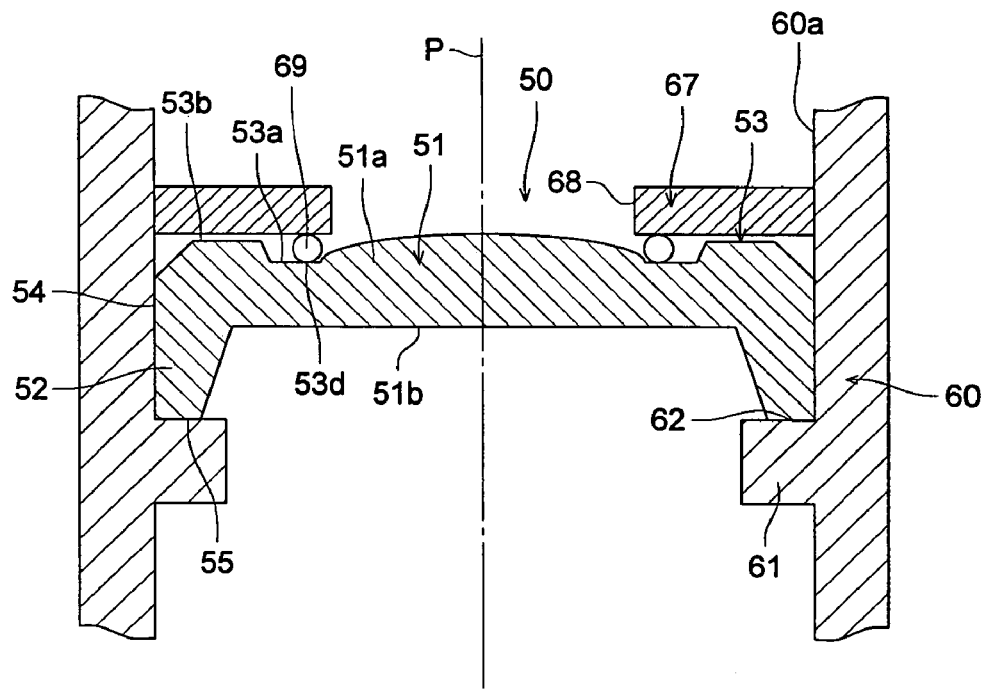
FIG. 4 is an essential part vertical cross-sectional view showing the forth embodiment of lens holding structure.

FIG. 4 is a main part vertical portion showing the lens holding structure of the fourth embodiment. The lens holding structure shown in FIG. 4 holds the lens 50 onto the inner surface 60a of the cylindrical lens 60 using a ring-like member 67 via a ring 69.

The lens holding structure of FIG. 4 has substantially the same structure as that of FIG. 3, except for the fact the lens is held by the ring-like member 67 using the middle ring 69, and thus the parts that are the same have been assigned the same numbers and descriptions thereof have been omitted.

As shown in FIG. 4, the middle ring 69 which is an O-shaped ring made of resin is disposed at the ring-shaped corner portion 53d which is positioned at the boundary between the convex portion 51a of the lens portion 51 and the concave portion 53a of the outer peripheral portion 53, and the middle ring 69 is pressed by the inner peripheral portion 68 of the ring-like member 67.

In the case where the lens 50 is mounted and held in the lens barrel 60, the lens 50 is inserted into the lens barrel 60 from the top of FIG. 4 with the mounting portion 52 at the lower side thereof, and abuts the holding surface 62 of holding portion 61 of the lens barrel 60. Next, the middle ring 69 is inserted into lens barrel 60 so as to fit onto the ring-like member 67 after being placed on the corner portion 53d of the lens 50 from the top of FIG. 3, and the middle ring 69 which is on the lens 50 is pressed by the ring-like member 67.

Because of this configuration, the lens 50 can be held between the holding member 61 of the lens barrel 60 and the ring-like member 67 via the middle ring 65, but due to the lens holding structure of FIG. 4, even if there is a temperature change of the lens barrel 60 due to the environment in which it is used, because the lens 50 is only pressed via the middle ring 69 by the ring-like member 67 from the upper portion of the drawing, the lens 50 can expand substantially freely due to the temperature change, and concentration of the stress caused by temperature change on the lens portion 51 becomes unlikely and stress generated due to temperature change is reduced. In this manner, generation of internal stress at the lens portion 51 is suppressed and change in the internal refractive index is controlled.

The ring-like member 67 is pressed on the lens 50 via the middle ring 69 which is disposed at the corner portion 53d of the lens 50, and this even if there is a temperature change, shifting of the optical axis of the lens 50 in the lens barrel 60 is prevented. In addition, because the middle ring 69 is made of a resin, there is little shape deformation due to temperature change, and thus the center position of the lens 50 is more accurate.

It is to be noted that the middle ring 69 is preferably formed of a material that is not too hard and not too soft, such as a fluorine resin for example. The outer diameter of the outermost periphery 14 of the lens 10 is smaller than the inner diameter of the lens barrel 20 such that the lens 10 can be loosely fit into the lens barrel 20.

Fifth Embodiment

Figure 10:
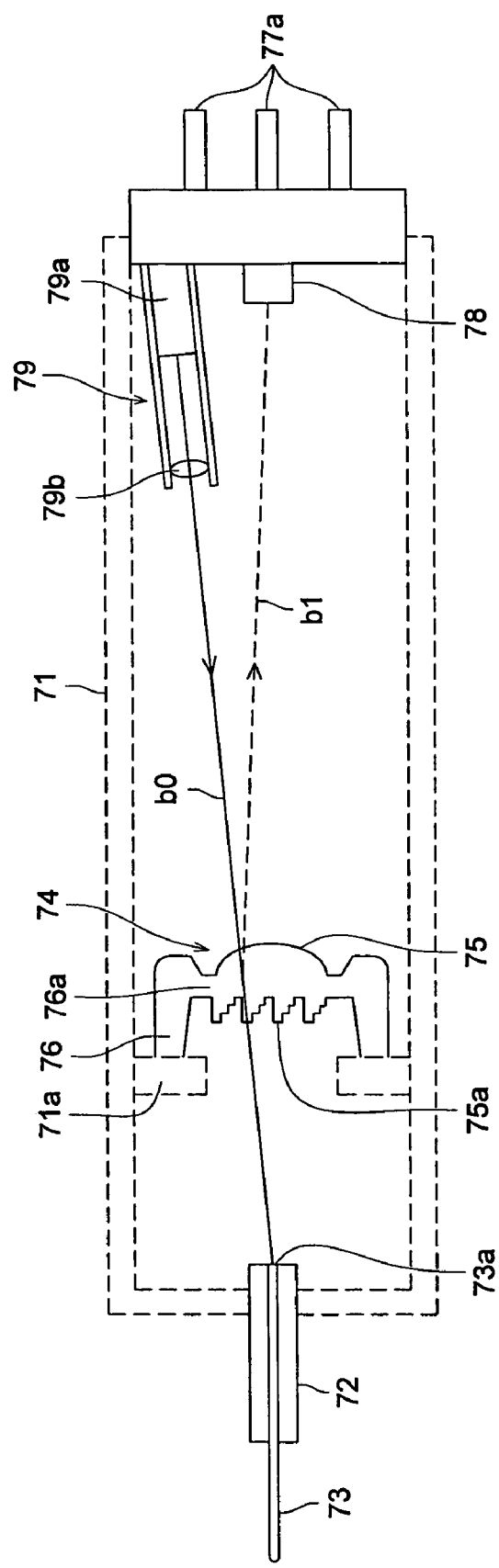
FIG. 10 is a pattern diagram of the inside of a bi-directional optical communication module of the fifth embodiment viewed from the side surface.

Next, the bi-directional optical communication module in which the lens is fixed by the lens holding structure of FIG. 1 is described with reference to FIG. 10. FIG. 10 is a pattern diagram of the inside of the bi-directional optical communication module of the fifth embodiment viewed from the side surface.

As shown in FIG. 10, a bidirectional optical communication module 70 has a plastic lens 74 disposed inside a cylindrical case 71 which is formed form steel or Kovar (trade name). A hollow cylindrical holding body 72 is mounted at the left end of the case 71 in the figure and the optical fiber 73 is inserted through the inside thereof. Transmission of optical signal that are sent from and received by other terminals is possible because the optical fiber 73 is connected to an optical communication system, and the signal receiving beam b1 exits and the signal emitting beam b0 enters at the end surface 73a.

Furthermore, the base 77 is mounted at the right end of case 71 in the figure, and a light receiving element 78 formed of photodiode, and a light emitting unit 79 is mounted at the inside surface of the base 77. The light emitting diode unit 7 includes a light emitting diode 79a which is a semiconductor laser and a glass lens 79 which are formed as one unit. The light receiving element 78 and the light emitting diode 79a are connected to an external terminal device (not shown) which can transmit electrical signals via the connector pin 77a which is planted on the base 77.

The lens 74 has substantially the same structure as that of FIG. 1 and is made up of an optical section 75 which has a lens function and a diffracting function; an outer peripheral portion 76a which is positioned on the outer peripheral side of the optical section 75 and extends to the outermost periphery of the lens 74; and is fixed with an bonding agent to the holding portion 71a which protrudes from the inner surface of the case 71 using the mounting portion 76, and is bonded and fixed using the same lens holding structure as in FIG. 1. One surface of the optical section 75 is formed such that the diffraction grating 75 which has a 4-step configuration is cyclically repeated.

The signal receiving beam b1 becomes a first order refracting beam at the diffraction grating 75a (shown by the broken line in the figure) and is focused on the light receiving surface of the light receiving element 78 and converted to electrical signals. The signal emitting beam b0 sent from the light emitting diode unit 79 is passed directly as a zero order refraction transmission beam (shown by the solid line) at the diffraction grating 75a, and then entered on the end surface 73a of the optical fiber 73 and passed through the optical fiber 73 and sent to the outside. The wavelength of the signal receiving beam b1 is 1.49 μm and the wavelength of the signal emitting beam b0 is 1.31 μm for example. As described above, the signal receiving beam b1 which is first order refraction beam and the signal emitting beam b0 which is the zero order refraction beam and which have different wavelengths are separated at the diffraction grating 75a.

With the bidirectional optical communication module 70, when the temperature at which the device is used changes within a range from room temperature to 85° C., the stress generated due to difference in expansion and contraction of the lens 74 that is formed from plastic and the case 71 that is formed from metal can be limited potions other than the optical section 75 like the mounting portion 76, and thus stress generation at the optical section 75 becomes difficult. As a result deformation of the optical section 75 is controlled, deterioration of the optical properties of the optical section 75 is controlled and shifting of the optical axis of the lens 74 is prevented. Thus even if the optical communication module 70 is used in an environment where there are temperature changes, deterioration in the capacity of the optical communication module to send and receive signals is controlled.

Sixth Embodiment

Figure 11:
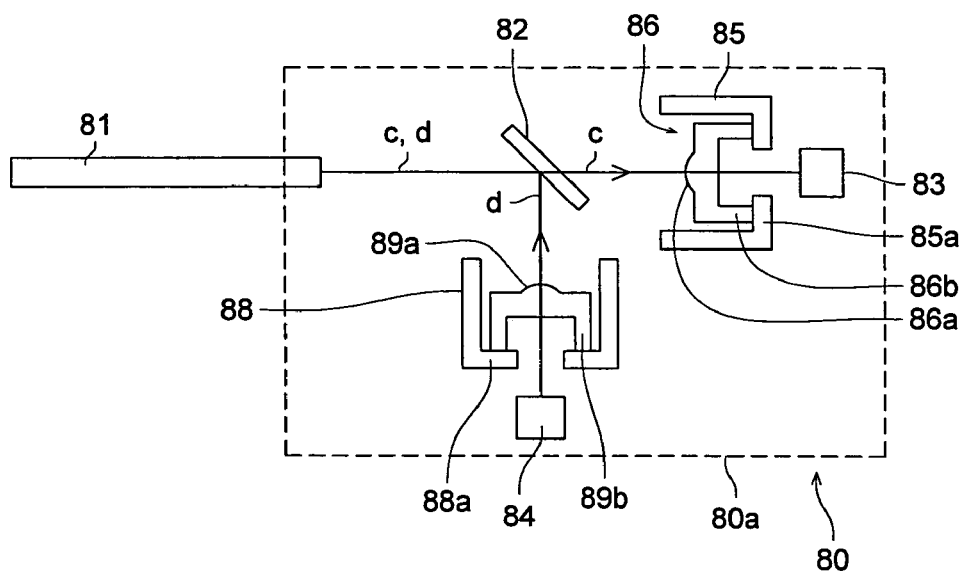
FIG. 11 is a pattern diagram of the inside of a bi-directional optical communication module of the sixth embodiment viewed from the side surface.

Next another example of the bidirectional optical communication module in which the lens is fixed by the lens holding structure of FIG. 1 is described with reference to FIG. 11. FIG. 11 is a pattern diagram of the inside of the bidirectional optical communication module of the sixth embodiment viewed from the side surface.

The optical communication module 80 of FIG. 11, is formed in the case 80a such that the signal receiving beam c from the optical transmission path of the optical communication system is entered from the end surface of the optical fiber 81 and then passed through the wavelength splitting filter 82, and then passed through the collimator lens 86 and then received at the light receiving element 83. In addition, signal emitting beam d from the light emitting diode 84 passes through collimator lens 89 and is reflected at the wavelength splitting filter 82 and entered onto the end surface of the optical fiber 81, and then sent on the optical transmission path of the optical communication system.

Each of the collimator lens 86 and 89 have substantially the same structure of those of FIG. 1 and comprises an optical sections 86a and 89a which have a lens function; and mounting portions 86b and 89b which are on the outer peripheral side of the optical sections 86a and 89a and extend in the direction of the respective optical axis; and are fixed by bonding to respective the holding portions 85a and 88a which protrudes from the lens barrels 85 and 88 using the mounting portion 86b and 89b. In FIG. 11, lens barrels 85 and 88 are formed metals such as steel or Kovar (trade name) and the collimator lens 86 and 89 are from plastic.

With the bidirectional optical communication module 80, when the temperature at which the device is used changes within a range from room temperature to 85° C., the stress generated due to difference in expansion and contraction of the collimator lens 86 and 89 that are formed from plastic and the lens barrels 85 and 88 that are formed from metal can be limited to portions other than the optical sections 86a and 89 such as the mounting portions 86b and 89b of the collimator lens 86 and 89 and thus stress generation at the o optical sections 86a and 89a becomes difficult. As a result deformation of the optical sections 86a and 89a is controlled, deterioration of the optical properties of the optical sections 86a and 89a is controlled and shifting of the optical axis of the collimator lens 86 and 89 is prevented. Thus even if the optical communication module 80 is used in an environment where there are temperature changes, deterioration in the capacity of the optical communication module to send and receive signals is controlled.

Working Example

The following is a description of this invention using a working example, but this invention is not to be limited by this working example. This working example uses a lens holding portion that is substantially similar to that of FIG. 1, and it fixes the plastic lens shown in FIG. 5 inside the lens barrel. The lens barrel is made of steel.

Figure 5:
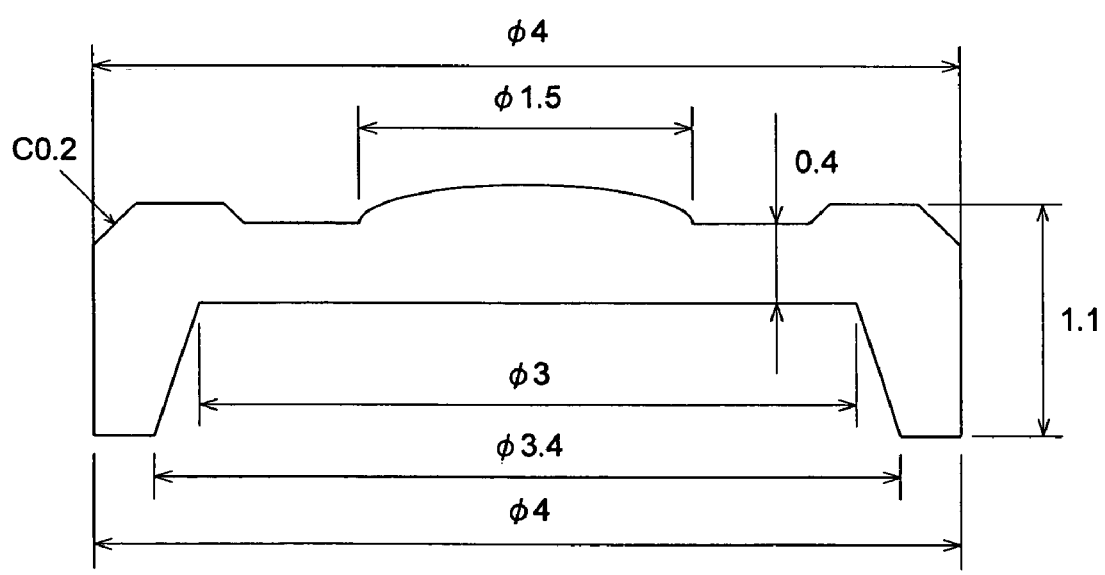
FIG. 5 is a view showing an example of lens
Figure 6:
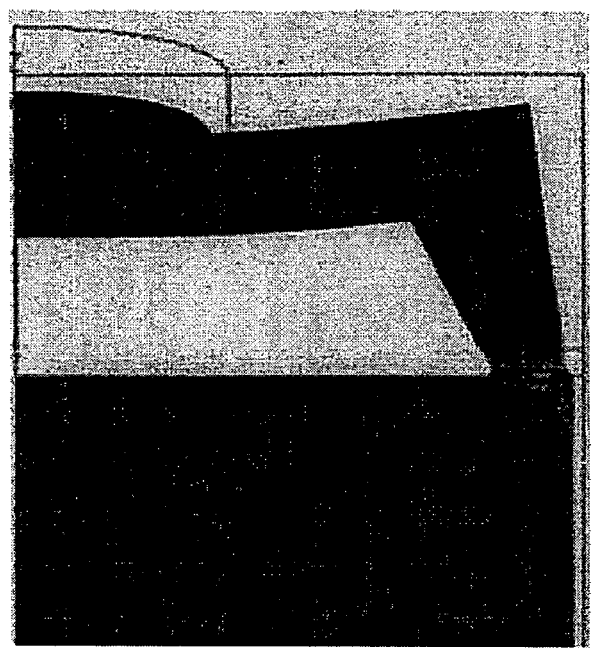
FIG. 6 is a figure showing a deformation of entire lens in an example where the lens is fixed by adhesive at a temperature of approx. 70° C. and then the temperature returns to normal temperature (25° C.)
Figure 7:
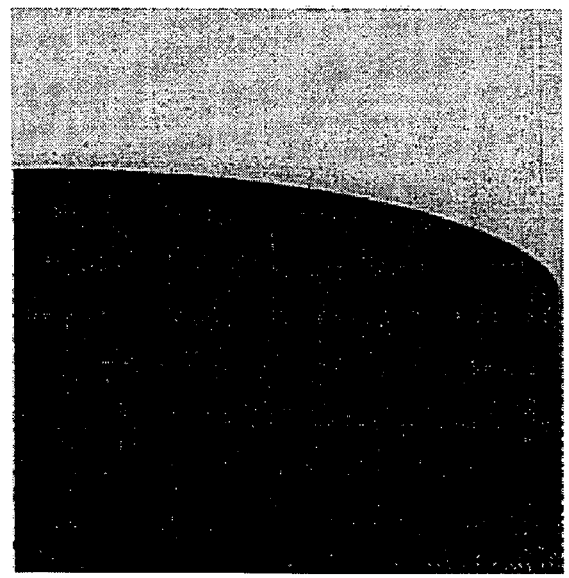
FIG. 7 is a figure indicating a distribution of refraction rate change (stress) in the plastic lens of FIG. 6 at each temperature (−40° C., 25° C. and 85° C.) by color.

The plastic lens of FIG. 5 is fixed by a bonding agent at 70° C. in the lens barrel shown in FIG. 1, and deformation of the entire lens when the temperature returns to room temperature (25° C.) is shown in FIG. 6. Next the results of calculating the refractive index change at various temperatures (−40° C., 25° C., 85° C.) and internal stress generated at the plastic lens of FIG. 5 is shown in FIG. 8. The distribution of the diffraction rate change (stress) at the lens portion plastic lens at this time is shown in FIG. 7. The distribution in FIG. 7 is shown by color, and the colors in FIG. 7 correspond to the colors shown on the bar in FIG. 8, and the colors on the bar of FIG. 8 correspond to the refraction rate change (stress) in the chart in FIG. 8.

From FIG. 6, it is seen that the plastic lens that is fixed inside the lens barrel is formed by the bonding agent layer and the portion in the vicinity thereof and this deforms, but the lens portion does not deform that much. Also, from FIGS. 7 and 8, it is seen that the distribution of the refractive index changes (stress) at the lens portion of the plastic lens only changes slightly at the vicinity of the outer periphery side, and thus there is no substantial change and the distribution is mostly even.

Figure 12:
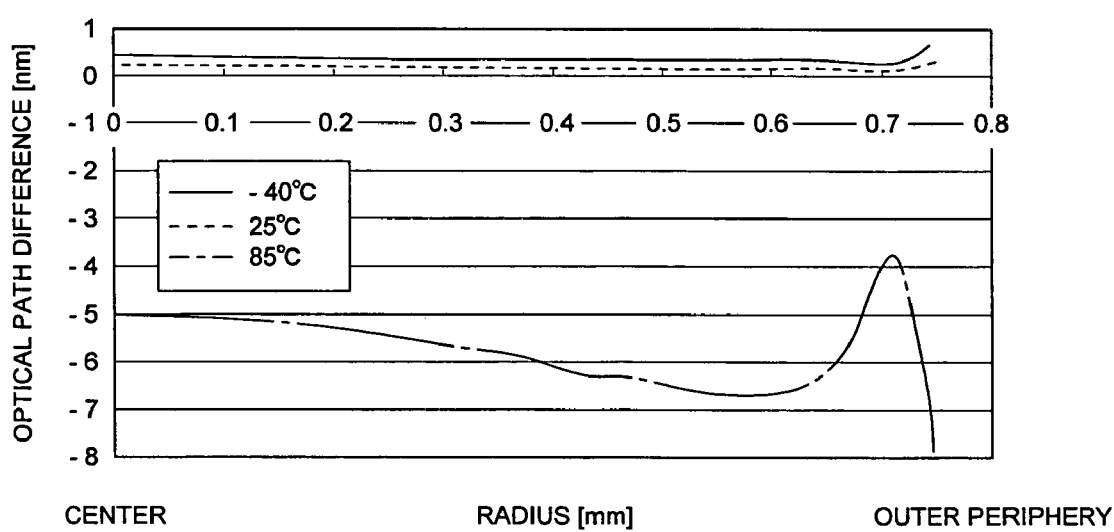
FIG. 12 is a graph showing a relation between an optical path difference and a radius position from the center of a lens when the temperature of the plastic lens of FIG. 5 in an example is at each temperature (−40° C., 25° C. and 85° C.)
Figure 13:
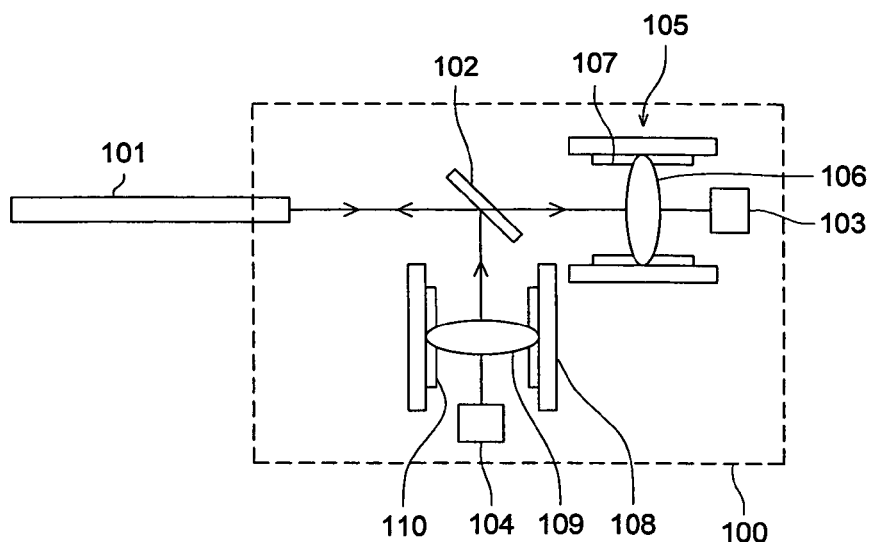
FIG. 13 is a pattern diagram of the inside of a conventional bidirectional optical communication module viewed from the side surface.

FIG. 12 shows the relationship between the optical light path difference and the radial position from the lens center when the plastic lens in FIG. 5 is at each of the temperatures −40° C., 25° C., and 85° C. From FIG. 12, it is seen that the optical light path difference does not depend on the radial position when the temperature is −40° C., 25° C., and is substantially fixed, and in the outer circumference vicinity of the lens portion changes slightly when the temperature is 85° C. But the internal refraction index change due to changes in stress is within a practical range.

Figure 9:
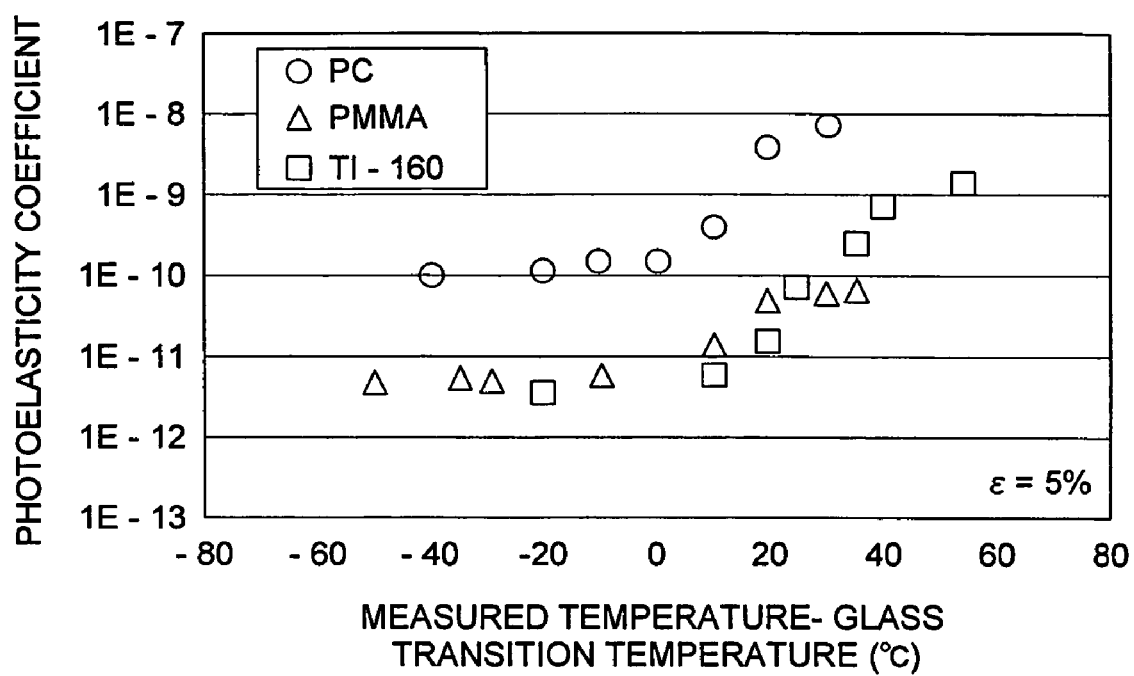
FIG. 9 is a graph showing a temperature relativity of optical elastic coefficient of various kinds of resins (extraction from "The property of transparent resin Olefin Maleimide Copolymer" by Yokkaichi laboratory of Touosou Co., Ltd.)
Figure 14:
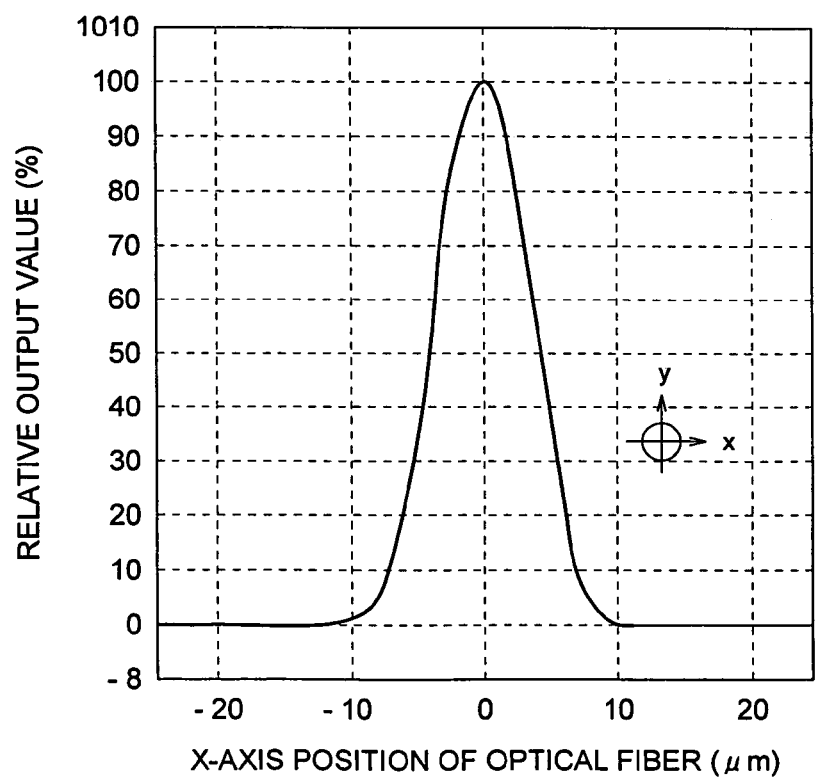
FIG. 14. is a graph showing an example of a relation between a position in X-axis on the plane of an optical fiber terminal and an output value.

The expansion and contraction in the range of the temperature for use (0-85° C.) when the plastic lens of FIG. 5 is held and fixed in the lens barrel with a bonding agent as in FIG. 1, is approximately 20 μm, but the accuracy of the center position is less than 1 μm and generation of stress at the lens portion is prevented. From FIG. 14, it is seen that if the shifting of the center position is less than 1 μm, there is little or no effect on output movement. It is to be noted that the Young's modulus, the linear expansion coefficient, and the Poisson number of the resin (plastic), the bonding agent and the steel respectively are as shown in Table 1. It is to be noted that in Table 1, "E-j" represents "$10^{-j}$" (this is the same for FIGS. 8 and 9 also).

TABLE 1

|  | Bonding agent | Resin | Steel |
| --- | --- | --- | --- |
| Young's modulus | 2.2 GPa | 3.2 GPa | 208 GPA |
| Linear expansion coefficient | 1.50E−04 | 6.00E−05 | 1.1.8E−05 |
| Poisson Number | 0.36 | 0.36 | 0.29 |

Preferred embodiments and a working example of the present invention have been described above but these are not intended to limit the invention and various modifications may be made without technologically departing from the spirit of the invention. For example, in FIG. 1-FIG. 4, the optical element that is to be held is a lens, but the invention is not limited thereto and, as a matter of course, the object to be held may be an optical element other than lens, such as a diffraction grating or an optical element having both a lens function and a diffraction function.

One lens portion of the lens in FIG. 1-FIG. 4 is convex surface, while the other is a flat surface, but the invention is not limited to this configuration, and both may be convex surfaces, or alternatively one surface may take a form like a diffraction grating.

Also, in FIG. 1-FIG. 4, the mounting portion extends in a substantially parallel direction with respect to optical axis, but the invention is not limited to this configuration, and the mounting portion may incline with respect to the optical axis.

What is claimed is:

1. An optical element holding structure, comprising:
    an optical element including an optical section having optical function, an outer peripheral portion which is positioned at an outer peripheral side of the optical section, and a mounting portion which protrudes from the outer peripheral portion in a direction substantially parallel to an optical axis; and
    a lens barrel holding the optical element inside;
    wherein given that an outside diameter of the optical element is D, a distance from a surface of the outer peripheral portion on a side of the outer peripheral portion opposite to the mounting portion to a front end of the mounting portion is L, and a thickness of the outer peripheral portion is A, the following equations are satisfied:

$D \geq 10 \times A$ $L \geq 2.5 \times A.$

2. An optical element holding structure of claim 1, wherein a linear expansion coefficient of the optical element is larger than a linear expansion coefficient of a material of the lens barrel.

3. An optical element holding structure of claim 1, wherein the mounting portion is fixed adhesively to a holding portion that is provided inside the lens barrel to oppose the mounting portion, so as to hold the optical element in the lens barrel.

4. An optical element holding structure of claim 1, wherein the mounting portion is adhered by an adhesive to a holding portion that is provided inside the lens barrel to oppose the mounting portion, so as to hold the optical element in the lens barrel.

5. An optical element holding structure of claim 4, wherein the adhesive is an ultraviolet hardening resin type adhesive.

6. An optical element holding structure of claim 1, wherein a holding portion is provided in the lens barrel to oppose the mounting portion, the mounting portion and the holding portion are fixed to each other by an adhesive at respective adhering surfaces thereof so as to hold the optical element in the lens barrel, and the adhering surfaces of the mounting portion and the holding portion are roughened.

7. An optical element holding structure of claim 1, wherein a holding portion is provided in the lens barrel and the mounting portion is fixed by a step so as to hold the optical element in the lens barrel.

8. An optical element holding structure of claim 1, wherein: p1 the mounting portion has a stepped mounting surface,
    a holding portion is provided in the lens barrel and comprises a stepped supporting surface corresponding to the stepped mounting surface, and
    the stepped mounting surface and the stepped supporting surface oppose each other so as to fix the optical element.

9. An optical element holding structure of claim 1, wherein:
    the mounting portion has a stepped mounting surface,
    a holding portion, which is made in the lens barrel, has a stepped supporting surface corresponding to the stepped mounting surface,
    the stepped mounting surface opposes the stepped supporting surface, and
    a retaining ring is disposed inside the lens barrel to press a mounting surface opposite to stepped mounting surface of the optical element so as to hold the optical element in the lens barrel.

10. An optical element holding structure of claim 1, wherein the optical element is held between a holding portion, which is provided in the lens barrel and opposes the mounting portion, and a ring-shaped member, which is disposed in the lens barrel such that a protruding portion of the ring-shaped member presses the side of the outer peripheral portion opposite to the mounting portion.

11. An optical element holding structure of claim 1, wherein the optical element is held between a holding portion, which is provided in the lens barrel and opposes the mounting portion, and a ring-shaped member, which is disposed in the lens barrel such that a protruding portion of the ring-shaped member abuts circumferentially with an inclined surface provided on the outer peripheral portion at the side of the outer peripheral portion opposite to the mounting portion.

12. An optical element holding structure of claim 1, wherein the optical element is held between a holding portion, which is provided in the lens barrel and opposes the mounting portion, and a ring-shaped member, which is disposed in the lens barrel to hold down a ring which is set on the outer peripheral portion at the side of the outer peripheral portion opposite to the mounting portion.

13. An optical element holding structure of claim 1, wherein the optical element is held between a holding portion, which is provided in the lens barrel and opposes the mounting portion, and a ring-shaped member, which is disposed in the lens barrel to hold down a ring which is set on an edge formed on the outer peripheral portion at the side of the outer peripheral portion opposite to the mounting portion.

14. An optical element holding structure of claim 1, wherein the optical element is held between a holding portion, which is provided in the lens barrel and opposes the mounting portion, and a ring-shaped member, which is disposed in the lens barrel to hold down a fluorine resin ring which is set on an edge formed on the outer peripheral portion at the side of the outer peripheral portion opposite to the mounting portion.

15. An optical element holding structure of claim 1, wherein the optical element is held between a holding portion, which protrudes from an inner surface of the lens barrel in a direction substantially perpendicular to the optical axis to contact the mounting portion of the optical section, and a ring-shaped member, which is installed in the lens barrel to press, via a protruding portion of the ring-shaped member, the outer peripheral portion at the side of the outer peripheral portion opposite to the mounting portion.

16. An optical element holding structure of claim 1, wherein the mounting portion protruding from the outer peripheral portion forms a plurality of legs.

17. An optical element holding structure of claim 1, wherein the outer peripheral portion is chamfered at the side of the outer peripheral portion opposite to the mounting portion,.

18. An optical communication module comprising the optical element holding structure of claim 1.

19. An optical element holding structure comprising:
an optical element including an optical section having optical function, an outer peripheral portion which is positioned at an outer peripheral side of the optical section, and a mounting portion which protrudes from the outer peripheral portion in a direction substantially parallel to an optical axis; and
a lens barrel holding the optical element inside;
wherein while the optical element is fixed in the lens barrel by the mounting portion, and a stress due to a change of environmental temperature can be relieved by the mounting portion and the outer peripheral portion and a distortion of the optical section can be suppressed.

20. An optical communication module, comprising:
a light emitting element for transmitting a light signal to an optical fiber terminal,
a light receiving element for receiving a light signal from the optical fiber terminal,
a separating device to separate a first optical path between the optical fiber terminal and the light emitting element from a second optical path between the optical fiber terminal and the light receiving element, and
an optical element holding structure, comprising: (i) an optical element including an optical section having optical function, an outer peripheral portion which is positioned at an outer peripheral side of the optical section, and a mounting portion which protrudes from the outer peripheral portion in a direction substantially parallel to an optical axis; and (ii) a lens barrel holding the optical element inside;
wherein the optical element is disposed between the optical fiber terminal and at least one of the light emitting element and the light receiving element.

* * * * *